[11] 3,583,784

| [72] | Inventors | David W. Hanna |
| | | Vestal; |
| | | Maurice A. Robbins, Jr., Endwell, N.Y. |
| [21] | Appl. No | 46,944 |
| [22] | Filed | June 17, 1970 |
| [45] | Patented | June 8, 1971 |
| [73] | Assignee | The United States of America as represented by the Secretary of the Navy |

[54] HOLOGRAM MANIPULATOR
6 Claims, 6 Drawing Figs.

[52] U.S. Cl.................................................... 350/3.5,
35/12
[51] Int. Cl........................................................ G02b 27/00
[50] Field of Search............................................ 350/3.5;
352/84, 85; 35/12N,P,S; 343/6, 17; 353/Inquired

[56] References Cited
UNITED STATES PATENTS
3,435,452   3/1969   Kilpartick.................... 350/3.5X
OTHER REFERENCES
Leith et al, PHYSICS TODAY, Aug. 1965, pp 26— 30
RODEMANN, NAVAL RESEARCH REVIEWS, Vol. 21, APRIL 1968, pp 7— 9

*Primary Examiner*—David Schonberg
*Assistant Examiner*—Ronald J. Stern
*Attorneys*—R. S. Sciascia, L. I. Shrago and R. K. Tendler ABSTRACT: Apparatus is provided for displaying continuous views of a three-dimensional image recorded on a holographic plate by rotating and translating the holographic plate in such a manner as to maintain the position of the holographic image at one point in space.

DAVID W. HANNA
MAURICE ROBBINS
INVENTORS

DAVID W. HANNA
MAURICE ROBBINS
INVENTORS

DAVID W. HANNA
MAURICE ROBBINS
INVENTORS

HOLOGRAM MANIPULATOR

The invention described herein may be manufactured and used by or for the Government of the United States of America for governmental purposes without the payment of any royalties thereon or therefor.

This invention relates to holographic displays and, more particularly, to apparatus which provides different perspective views of the holographic image by rotating and shifting the holographic plate in a manner which insures that the real image produced by illuminating the hologram will remain at the same point in space during and after the rotation.

One use of a holographic display has been to provide a pilot with a view of an aircraft carrier when the aircraft encounters poor visibility during a landing approach. In one type of holographic display, the image of the aircraft carrier is made to correspond to that which the pilot would see if vision were not obscured. The image that the pilot sees is made to change in response to control signals from the carrier which are generated in response to the radar signals reflected from the aircraft and returned to the carrier. These signals manipulate the display optics to provide the pilot with the perspective of the carrier that the aircraft encounters when it makes its final landing approach. Heretofore, the display apparatus has provided different perspective views by rotating the holographic image once it is formed. This technique requires complicated optical processing. Perspective views of the real image are provided in the subject invention by translating the holographic plate itself. A system which merely translates the plate to provide different perspective views suffers because the image moves from a nominal position in space as the plate is translated. The apparatus described herein simultaneously translates and rotates the holographic plate so that the real image remains at the same point in space when the perspective is continuously varied. Thus, the pilot need not move his head when different perspective views are provided by the holographic display.

Holographic images produced when a properly prepared holographic plate is illuminated by monochromatic light have all the three-dimensional aspects as the object used to make the holographic plate. When the entire holographic plate is properly illuminated with monochromatic light, a three-dimensional virtual image may be viewed by looking into the plate, much as a viewer would look at the original object through a window the same size as the holographic plate. Each point on the plate represents a given viewing angle of the original object. Furthermore, a three-dimensional real image may be generated from the same holographic plate by properly illuminating a small area of the plate that corresponds to the desired viewing angle or perspective view. The real image may be viewed directly on a screen or ground glass or may undergo further optical processing. The subject invention provides for generation of different perspective views of this real image at one place by simultaneously rotating and translating the holographic plate, thereby effectively rotating the holographic image about its center. The ability to rotate the holographic image without distorting it or moving it from its original location is not easily acquired because the real image is not contained in the plane of the hologram but exists in space at a distance therefrom.

The subject apparatus provides for rotation of the holographic plate in two orthogonal directions by supporting the plate in a double-ring assembly gimbaled in these two directions. Within the assembly is a subassembly which holds the holographic plate and which translates with respect to the double-ring assembly. This subassembly is mechanically coupled to the frame supporting the gimbaled rings and the outermost ring so that the holographic plate is made to rotate in the opposite direction from the direction of translation of the image when the hologram is translated. Translation of the hologram relative to the narrow reconstruction beam is necessary to change perspective. Simultaneous rotation is required to keep the image from moving the same distance the hologram translates.

It is therefore an object of this invention to provide apparatus for displaying continuous perspective views of the object recorded on a holographic plate by rotating and translating the plate.

It is a further object of this invention to provide continuously rotated images formed by illuminating a holographic plate by causing the illuminated portion of the plate to be maintained a fixed distance from the real image.

It is another object of this invention to provide apparatus, gimbaled in two orthogonal directions, for rotating a holographic plate in these directions and a subassembly carried by this apparatus for causing the holographic plate to translate in one orthogonal direction in response to a rotation of the plate in that direction.

Other objects, advantages and novel features of the invention will become apparent from the following detailed description thereof when considered in conjunction with the accompanying drawings in which like numerals represent like parts throughout and wherein.

Figure 1:
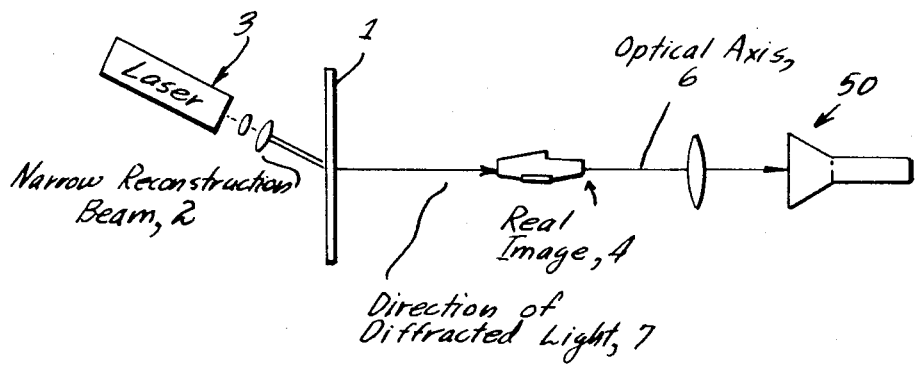
FIG. 1 is a diagram of a holographic image generator in which an image is reconstructed from a holographic plate.
Figure 2:
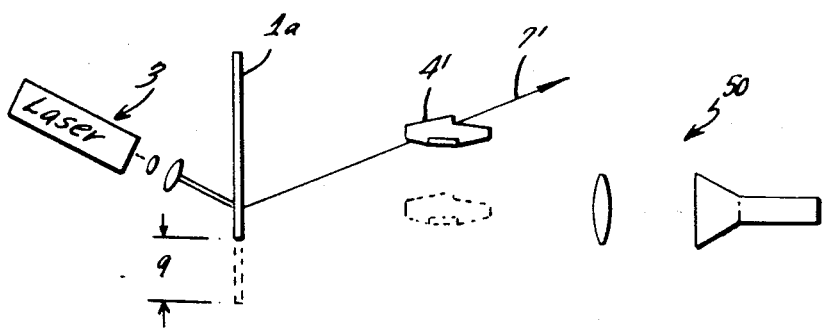
FIG. 2 shows the motion of a holographic image when the holographic plate is translated only.
Figure 3:
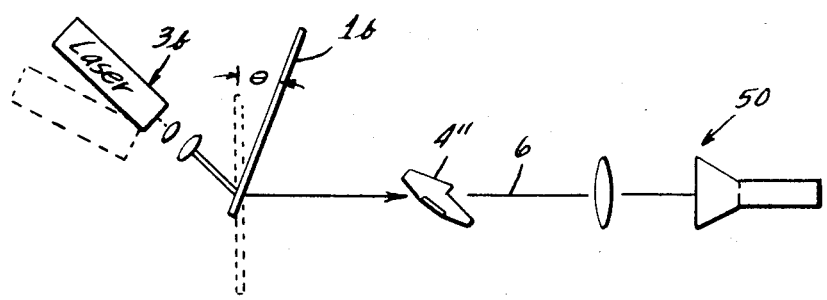
FIG. 3 shows the image rotation that occurs when the hologram is appropriately translated and rotated.
Figure 4:
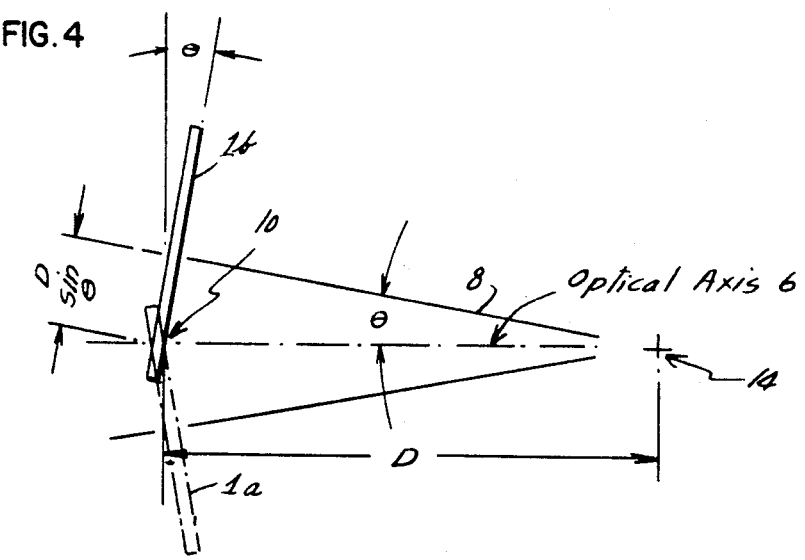
FIG. 4 shows the path that the holographic plate must describe in one orthogonal direction in order to maintain the holographic image at one point in space.
Figure 5:
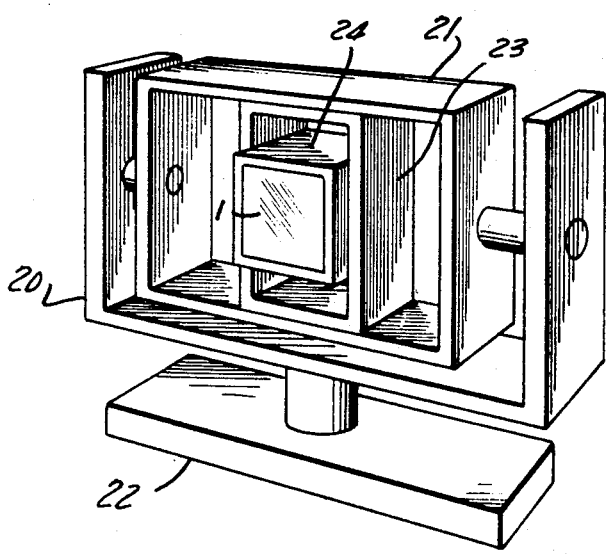
Figure 6:
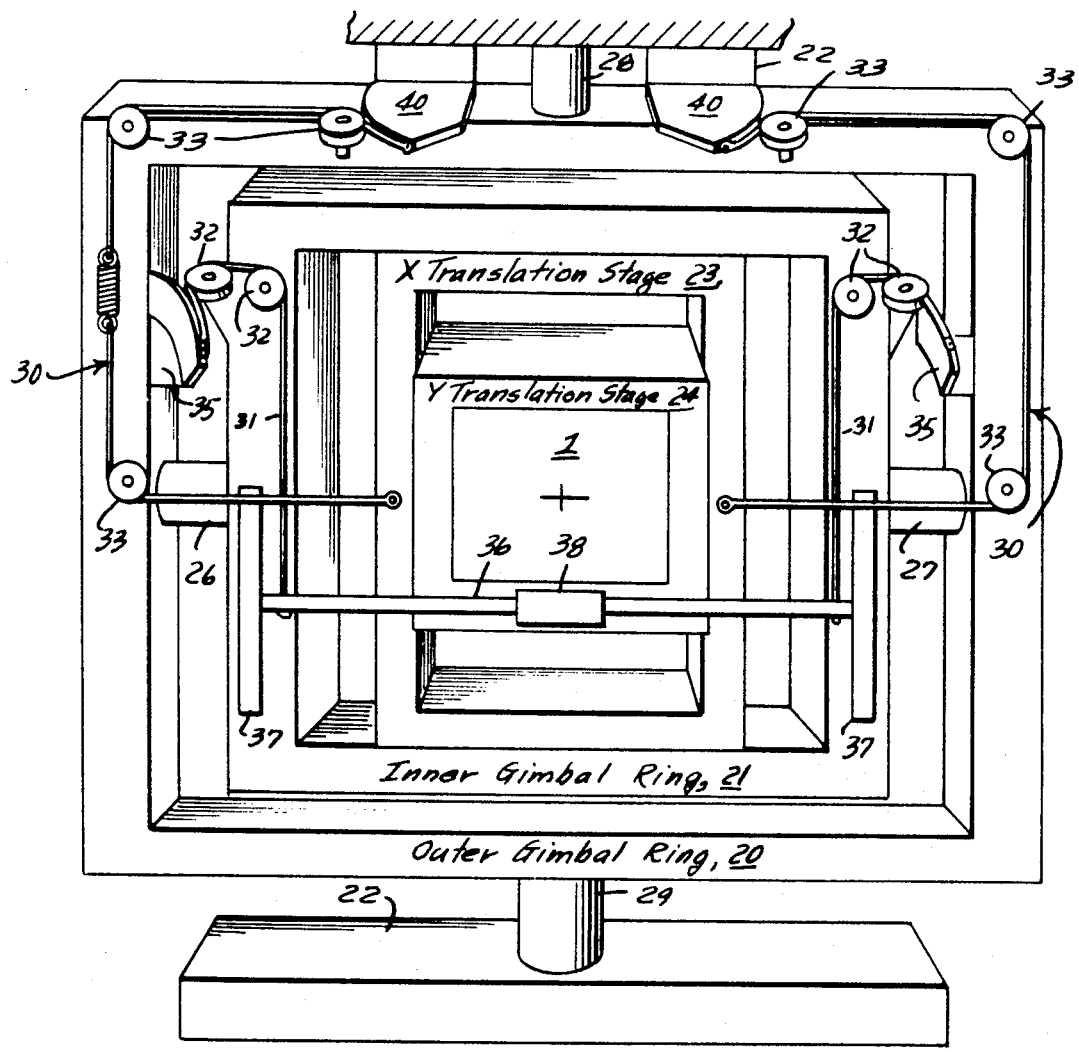

FIG. 5 is a diagram of a two-axis gimbal with an X-Y translational stage carried on the inner gimbal. Also shown is the holographic plate carried in the X-Y translational stage: and FIG. 6 is a diagram of the coupling utilized by the apparatus shown in FIG. 5 to rotate and simultaneously translate the holographic plate so that the plate will describe the path shown in FIG. 4 in two orthogonal directions. Referring to FIG. 1, the reconstruction of a real image is shown. Here a small spot on holographic plate 1 is illuminated by narrow reconstruction beam 2 from a conventional laser source 3 to produce a real image 4 at some distance from the holographic plate. This real image lies along an original optical axis 6, which is the original direction 7 of the diffracted light from hologram 1. The present invention provides a means for mechanically manipulating holographic plate 1 in such a way that the three-dimensional real image produced by the hologram may be rotated in two axes to display continuously variable perspective views of the hologram without displacing the image from its nominal position in space along this original optical axis. The illumination scheme shown in FIG. 1 is the conventional method of illuminating a holographic plate from one side in order to produce a real image on the other side of the plate. This image will appear to be three dimensional if the object used to make the hologram was three dimensional. The image may be moved so that a different perspective is in view by translating the holographic plate relative to the reconstruction beam as shown in FIG. 2. This translation is shown by distance 9 and new position 1a. However, when this is done, the image will be shifted in position or translated as shown by the new image 4'. The image must then be viewed from a different direction, 7', in order to receive the light diffracted from the small area illuminated on the hologram. This new viewing direction, 7', reveals a different perspective view of the image. In order for the diffracted light path to be redirected along the original optical axis 6 and for the image to appear in its original position, the hologram must now be rotated through an angle θ, as shown in FIG. 3. The rotation of the holographic plate is mechanically coupled to the translation so that these motions occur simultaneously. Thus, continuously variable perspective changes may be achieved. After this simultaneous translation and rotation, the final image 4" will appear in the perspective shown and along original optical axis 6. The simultaneous translation and rotation thus maintain the image at the same point in space while providing different perspective views. This permits the placing of additional optical processing equipment 50 at a fixed position along the original optical axis. This equipment may include additional optics and a vidicon image detector. Alternately, a ground glass plate (not shown) may be located perpendicular to optical axis 6 for direct viewing of the real image.

It will be apparent that the mechanism which holds the holographic plate must simultaneously translate and rotate in such a way that a perpendicular to the plate centerpoint always passes through a fixed point in space removed from the holographic plate along the fixed optical axis 6. This prescribed motion is shown in FIG. 4 in one of the two orthogonal directions necessary to provide a three-dimensional rotation of the image.

In FIG. 4, the holographic plate is shown displaced on either side of the optical axis 6 in such a manner that the above-mentioned perpendicular will always cross the optical axis at a point whose location is shown by arrow 14. This point is where an original real image is formed. The amount of translation necessary to provide a different perspective view of this original image at the same point in space is given by the equation $D \sin \theta$ where $D$ is fixed and refers to the distance between the center of the spot on the holographic plate produced by the illumination from the narrow laser beam and point 14. $\theta$ is the angle of rotation of the plate, is the angle through which the image is rotated and is the angle subtended by optical axis 6 and the newly formed perpendicular 8. The translational motion of the plate, $D \sin \theta$, as well as its rotation, is accomplished by the double-ring gimbal and carriage structure shown diagrammatically in FIG. 5. It will be appreciated that the point at which the real image occurs can be moved along axis 6 by adjusting the distance of the laser from the hologram. This will result in increasing or decreasing the size of the real image and corresponds to viewing the object from which the hologram is made from different distances.

FIG. 5 is a perspective view of a two-axis gimbal which supports an X-Y translational stage and which carries holographic plate 1. The hologram is recorded on this plate. In practice, the hologram is illuminated by laser 3 of FIGS. 1 and 2 which produces a real image on the opposite side of the holographic plate. This support structure is composed of an outer gimbal ring 20 mounted on a base 22 for rotation about a vertical axis. Inner ring 21 is gimbaled on the outer ring for rotation about a horizontal axis. The X-translation stage, 23, is mounted for horizontal displacement within inner gimbal 21 and Y-translation stage 24 is mounted for vertical displacement within the X-translation stage. The cooperation and coupling of the X-Y stages with the inner and outer gimbals are now described.

In FIG. 6, a two-axis gimbal is shown comprised of an outer gimbal ring 20 and an inner gimbal ring 21 supported by a frame 22. This gimbal ring structure provides for rotation in two orthogonal directions. The first of these orthogonal directions is rotation about a horizontal axis defined by bushings 26 and 27 which support the inner gimbal ring. The rotation about a second orthogonal direction is accomplished by rotation about a vertical axis defined by bushings 28 and 29 which support the outer gimbal ring. Within this two-axis gimbal is supported an X-Y translational subassembly in which is held the holographic plate.

This subassembly is a carriage within a carriage. The outer carriage 23 reciprocates in the horizontal direction and is carried by frame 21, the inner gimbal ring. The outer carriage is also a frame in which inner carriage 24 is mounted for reciprocation in the vertical direction. Inner carriage 24 is also a frame, and it is in this frame that holographic plate 1 is carried.

The X-Y translational stage and the two-axis gimbaling arrangement permit the necessary freedom of the hologram to describe the path shown in FIG. 4. It will be appreciated that a cylindrical volume around optical axis 6, shown in FIG. 4, must remain unobstructed by the aforementioned linkages or structural supports so as not to obscure the optical path. This constraint precluded placing a fixed pivot at the virtual center of rotation, shown in FIG. 4 at 14, and running a radial link back to the X-Y carriage. The problem of providing the appropriate rotation and translation is therefore accomplished by means of spring-tensioned, flexible cables 30 and 31, riding on idler pulleys 32 and 33 which couple the angular motion of each of the two gimbal rings to the X and the Y-motion provided by the hologram carriage. The driving end of each cable is attached to the periphery of a circular sector beyond the cable's point of tangency with that sector. The driven end of the cables are mechanically connected to the X-Y translational carriage as shown in FIG. 6. The motion in the vertical plane is coupled as follows. Relative angular motion between a set of pulleys 32 on inner gimbal ring 21 and sectors 35 attached to the outer gimbal ring, having their centers at the aforementioned horizontal gimbal axis, takes up or lets out a length of cable proportional to the angular displacement of the inner gimbal ring. This linear displacement is transferred through cables 31 to guide bar 36 which is constrained to up and down motion by vertically oriented guides 37 carried on inner gimbal ring 21. A slide bushing 38, attached to frame 24, rides on guide bar 36, coupling the vertical motion of the frame to the bar while permitting horizontal motion relative to it. Thus by pivoting the top part of inner gimbal 21 into the paper about bushings 26 and 27, an appropriate upward movement of frame 24 will be provided. This movement is given by the formula $y=D \sin \theta_y$ where $\theta_y$ is the angular rotation of the inner gimbal ring from an X-Y plane defined by the plane of the paper.

The motion in the horizontal plane is as follows. Relative angular motion between the set of pulleys 33 on the outer gimbal ring and circular sectors 40, attached to frame 22 and having their centers at the vertical gimbal axis defined by bushings 28 and 29, takes up and lets out a length of cable proportional to the angular displacement of the outer gimbal ring from an X-Y plane. This angular displacement is transferred by cables 30 to frame 23 which provides translation in the X-direction. In passing from the outer gimbal ring to frame 23, the cables pass through the center of the horizontal gimbal bushings 26 and 27 which are coincident with the horizontal axis of the rotation. This insures that the angular motion between the inner and outer gimbal rings does not affect the positioning of frame 23. Thus, crosscoupling between the two orthogonal planes is completely eliminated.

To generate the exact motion by the geometry depicted in FIG. 3, the linear displacement of the hologram carriage should be a sine function of the angular displacement of the gimbal rather than being a linear function of the angle. The difference between the linear function and the sine function, the so-called displacement error, is so slight for angles up to ±14° that this angular error can be neglected. By proper selection of the proportionality constant between translation and rotation, which is a function of the radius of the sector, this error is equally divided on both sides of the nominal displacement function, effectively halving the absolute error. The resulting positional error in the holographic image resolves to a maximum focus error of less than 0.002 inches and a maximum lateral error of 0.006 inches with the real image located 10 inches from the center of the holographic plate.

In order to generate the motion described in FIG. 4 with the real image moved 10 inches from the gimbal center, the effective radius of the sectors must be 9.93 inches. It is, however, desirable to reduce the size of the sectors due to their bulk. With an effective reduction of exactly half of the 9.93 dimension and the use of additional floating pulleys (not shown), the displacement generated by the sectors is doubled; and thus the use of smaller drive sector components is permitted.

It will be appreciated that, in addition to the cable drive system shown in FIG. 5, equivalent alternate designs using gears or cams will effectively provide for the prescribed motion of the holographic plate. This prescribed motion is such that a perpendicular through the center of the holographic plate always passes through the point in space where the original real image is formed. In order to show a different perspective view of this image, the holographic plate is made to translate and rotate in such a manner that the center of the spot on the holographic plate formed by the narrow laser beam is fixed and kept at a constant distance from the point in space where the real image was formed. When the motion of the holographic plate is constrained by these two conditions, movement of the holographic plate will produce various perspective views at the same nominal point in space at which the original real image was formed.

What I claim is:

1. Apparatus for providing variable perspective views of the real image produced by a hologram recorded on a holographic plate illuminated on one side by a narrow monochromatic beam of light having a cross-sectional area significantly smaller than the area of said hologram comprising:

means for supporting said plate such that a perpendicular through the center of said plate always passes through a first fixed point in space and such that the area on said hologram illuminated by said narrow beam is always at a fixed point in space a fixed distance from said first point, whereby whenever said plate is moved to provide variable perspective views of said real image said views are always formed at said first point in space.

2. Apparatus for providing variable perspective views of the real image produced by a hologram recorded on a holographic plate illuminated on one side by a narrow monochromatic beam of light having a cross-sectional area significantly smaller than the area of said hologram comprising:

means for supporting said plate; and means for simultaneously translating and rotating said supporting means in the path of said beam such that a perpendicular through the center of said hologram always passes through a first fixed point in space and such that said hologram at all times contains a second fixed point in space a predetermined distance from said first fixed point, said second fixed point being the center of the area on said hologram illuminated by said narrow beam, whereby continuously variable perspective views of said real image are always formed at said first fixed point when said plate is simultaneously translated and rotated.

3. Apparatus for providing continuously variable perspective views of the real image produced by a hologram recorded on a photographic plate illuminated on one side by a narrow monochromatic beam of light having a cross-sectional area significantly smaller than the area of said hologram comprising:

means for supporting said plate in the path of said light beam and means for simultaneously translating and rotating said supporting means such that said photographic plate is simultaneously translated and rotated relative to said beam such that a perpendicular through the center of said plate passes through a first fixed point in space at which a real image is formed and such that said hologram always contains a second fixed point in space coincident with the center of the illuminated area on said hologram, the distance between said points being maintained constant when said plate is simultaneously translated and rotated, whereby continuously variable perspective views of said real image are always formed at the same point in space.

4. The apparatus as recited in claim 3 wherein said plate is translated a distance equal to the distance of said real image from the center of said illuminated area multiplied by the sine of the angle through which said plate is rotated.

5. The apparatus as recited in claim 3 wherein said supporting means includes:

a double-ring gimbal having rotational degrees of freedom about horizontal and vertical axes;

a subassembly mounted on the inner ring of said gimbal, said subassembly including a first frame mounted for horizontal translation within said inner gimbal and a second frame carried within said first frame and mounted for vertical translation within said first frame, said second frame supporting said photographic plate; and means for coupling the translational motion of said first frame with the rotational motion of the outer ring of said gimbal and for coupling the translational motion of said second frame with the rotational motion of said inner ring such that translation of said plate in either the horizontal or vertical direction is accompanied by that corresponding rotation of said plate which maintains said perpendicular coincident with the point in space at which said real image is formed.

6. The apparatus as recited in claim 5 wherein said means for coupling includes:

a support structure for said gimbal;

a first pair of circular sectors attached to said support structure, said sectors having a center coincident with the vertical axis of the outer ring of said gimbal; pulley means having a pair of strands, one end of each of said strands being attached to a different sector beyond the point of tangency thereto and the other end of each strand being attached to said first frame such that said first frame is displaced in a horizontal direction by a push-pull action in response to a change in the angle between said support structure and said outer gimbal ring;

a second pair of circular sectors attached to said outer gimbal on opposite sides thereof and having their centers coincident with the horizontal axis of said inner gimbal; and second pulley means having a second pair of strands, one end of each strand of said second pair being attached to a different one of said second pair of sectors and the other end of each of said last-mentioned strands being attached to said second frame such that said second frame is displaced in a vertical direction by a push-pull action in response to a change in the angle between said inner and outer gimbal rings.